US012350960B2

(12) United States Patent
Chan

(10) Patent No.: US 12,350,960 B2
(45) Date of Patent: Jul. 8, 2025

(54) APPARATUS AND METHOD FOR ATTACHING AND DETACHING PANELS AND BOARDS TO FIXED SURFACES

(71) Applicant: Hitech128 International Limited, Hong Kong (HK)

(72) Inventor: Kan Chan, Hong Kong (HK)

(73) Assignee: Hitech128 International Limited, Hong Kong (HK)

( * ) Notice: Subject to any disclaimer, the term of this patent is extended or adjusted under 35 U.S.C. 154(b) by 196 days.

(21) Appl. No.: 18/460,674

(22) Filed: Sep. 4, 2023

(65) Prior Publication Data

US 2024/0123758 A1 Apr. 18, 2024

(30) Foreign Application Priority Data

Oct. 13, 2022 (CN) ........................ 202222698273.0

(51) Int. Cl.
*G09F 7/18* (2006.01)
*B44D 3/18* (2006.01)

(52) U.S. Cl.
CPC ...................................... *B44D 3/18* (2013.01)

(58) Field of Classification Search
CPC ..... B44D 3/18; G09F 7/18; G09F 2007/1843; A47G 1/1606; A47G 1/17
See application file for complete search history.

(56) References Cited

U.S. PATENT DOCUMENTS 1,519,575 A * 12/1924 Trevalyn .................. B60R 7/04 40/784
5,283,967 A * 2/1994 Abrams .................... G09F 1/12 40/773
8,959,816 B1 * 2/2015 Lorenzo ................ H04L 63/102 40/711
11,974,680 B1 * 5/2024 Davis ..................... A47G 1/065
2013/0112823 A1 * 5/2013 Kreft ....................... G09F 7/002 248/205.3
2014/0041268 A1 * 2/2014 Benumof ................. B23C 3/00 409/131
2016/0073796 A1 * 3/2016 Nesbitt ..................... G09F 7/04 40/711
2017/0265660 A1 * 9/2017 Cappelle ................ A47G 1/065
2021/0204724 A1 * 7/2021 Phillips .................... A47G 1/06

* cited by examiner

*Primary Examiner* — Gary C Hoge
(74) *Attorney, Agent, or Firm* — IDEA Intellectual Limited; Sam T. Yip

(57) ABSTRACT

A detachable board includes a body, a filling foam, and mounting patches. The body includes a recessed area on the back of the body made by stamping process. The filling foam forms mounting slots with an inner wall and corners of the recessed area rim. During installation, the filling foam and the mounting patches are snuggly fitted in the recessed area. The mounting patch comprises a release film layer, an adhesive layer, and a substrate layer. The substrate layer is in contact with the body of the detachable board, and the adhesive layer is pasted onto a fixed surface for mounting the detachable board onto the fixed surface.

9 Claims, 4 Drawing Sheets

APPARATUS AND METHOD FOR ATTACHING AND DETACHING PANELS AND BOARDS TO FIXED SURFACES

CROSS-REFERENCE OF RELATED APPLICATION

This present application claims priority to China Patent Application No. 202222698273.0 filed Oct. 13, 2022; the disclosure of which is incorporated by reference herein in its entirety.

FIELD OF THE INVENTION

The present invention relates to the field of panels and boards. More specifically, it relates to mechanisms for attaching and detaching panels and boards to fixed surfaces.

BACKGROUND OF THE INVENTION

Conventionally, a drawing board (or blackboard) requires a matching easel to fix. When the easel is fixed, the user must carry the drawing board and the easel at the same time, which is very inconvenient, especially in the small space of the conference room. The easel occupies a large place, and it is also hard to store. Meanwhile, the easel is generally high-cost aluminum alloy shelf, which is inconvenient to move back and forth. Therefore, the present invention provides a detachable board to solve the shortcomings of the state of the art.

SUMMARY OF THE INVENTION

It is an objective of the present invention to provide a detachable board, which has the advantages of simple structure, rational design, small floor space, low in cost, and easy to store and move. To overcome the presented technical problems, the present invention provides the following technical solution: a detachable board comprises a body, a filling foam, and one or more mounting patches. The body includes a recessed area on the back of the body made by stamping process. The filling foam is arranged to be positioned within the recessed area, and with the inner walls and/or inner corners of the rim of the recessed area, to form one or more mounting slots. The shape of each of the mounting slots matches that of each of the mounting patches. In one embodiment, the filling foam is further configured to provide one or more notches on its edges that form part of each of the mounting slots.

During installation, the filling form is first installed in the recessed area, then the mounting patches are snuggly fitted into the mounting slots.

In accordance with one embodiment of the present invention, the thickness of the filling foam is same as the depth of the recessed area.

In accordance with one embodiment, there are four mounting patches. Each of the mounting patches has a thickness greater than the depth of the recessed area. Each of the mounting patches has a horizontal surface area (or volume) slightly larger than that of each of the mounting slots.

The cross-section of each of the plurality of mounting patches from top to bottom includes: a release film layer, an adhesive layer, and a substrate layer. The substrate layer is configured to be in contact with the body of the detachable board when the mounting patches are fitted within the mounting slots.

In accordance with one embodiment, the release film layer is provided with a shielding block. The shielding block is integrated to the release film layer in one-piece, and the shielding block can completely cover the protrusion.

In accordance with another embodiment of the present invention, the substrate layer is a memory foam or an elastic resin.

The present invention has the following advantages compared to the state of the art:

The present invention provides a detachable board. The detachable board includes a detachable board body, a filling foam, and one or more mounting patches. The overall structure is simple and the design is rational. The detachable board body is configured with a recessed area on its back by stamping process. The filling form is arranged and positioned in the recessed area and forms one or more mounting slots. During installation, the filling foam is to be installed in the recessed area, then the mounting patches are snuggly fitted into the mounting slots. Further, the thickness of the mounting patches is greater than the depth of the recessed area. When the detachable board is ready to be mounted onto a fixed surface, the mounting patches are protruding outward from the recessed area, which is convenient for the mounting operation. Meanwhile, the volume of each of the mounting patches is slightly larger than that of each of the mounting slots, providing a tight fitting, and thus strong gripping force, between the mounting patches and the mounting slots, so that the detachable board does not easily fall off when mounted. The notches, which allow the insertion of human fingers for handling the filling form, further ease the installation operation.

The cross-section of the mounting patch from top to bottom is: the release film layer, the adhesive layer, and the substrate layer. The release film layer is provided with a shielding cover, and the shielding cover can completely cover the notch corresponding to the mounting patch, which effectively prevent dust from entering the notch. At the same time, the release film layer can also protect the adhesive layer. Only the release film layer is needed to be peeled off during use. And the adhesive layer may paste onto a fixed surface, such as glass or a smooth wall. It is convenient to use in a small conference room. Compared to the traditional drawing board with the easel, the detachable board provides many practical utilities such as small floor space, low cost, and easy to move back and forth.

The present invention meets the diversified needs of users by printing text patterns on the erasable coating, and has strong practicability.

BRIEF DESCRIPTION OF THE DRAWINGS

Embodiments of the invention are described in more detail hereinafter with reference to the drawings, in which.

DETAILED DESCRIPTION

The disclosure in the following be combined with drawings according to an embodiment of a detachable board. The technical solution in the embodiment of the present invention is clearly and completely described. Specifically, the embodiment described is only an embodiment of the present invention in part, not all embodiments. Based on the embodiments in the present invention, all other embodiments obtained by a person skilled in the art without undue experimentation fall within the scope of the claimed invention.

In the description of the present embodiment of the invention, the terms "length", "width", "up", "down", "front", "back", "left", "right", "vertical", "horizontal", "top", "bottom", "inside", "outside", etc. indicate the orientation or position relationship based on the accompanying drawings, and they are only for the convenience of describing the embodiment of the present invention and simplifying the description. The terms do not indicate or imply that the device or element referred to must be constructed or operated in a particular orientation, and therefore, they cannot be understood as a limitation of the present invention. Furthermore, the terms "first" and "second" are for descriptive purposes only and cannot be understood as indicating or implying relative importance or implicitly indicating the quantity of the indicated technical feature. Thus, the feature qualified with "first" and "second" may explicitly or implicitly include one or more such features. In the description of the present invention embodiment, "plurality" means two or more, unless otherwise expressly specified.

In the present embodiment of the present invention, unless otherwise expressly provided or specified, the terms "mounting", "filled", "installed", "coupled", "connection", "fixed" and other terms should be understood in a broad sense, for example, may be a fixed connection, may be a removable connection, or as a whole. It can be mechanically connected or electrically connected. It may be directly connected, indirectly connected through an intermediate medium, connected within two components, or interacted with each other. For a person skilled in the art, the specific meaning of the above terms for an embodiment of the detachable board may be understood according to a specific circumstance.

Figure 1:
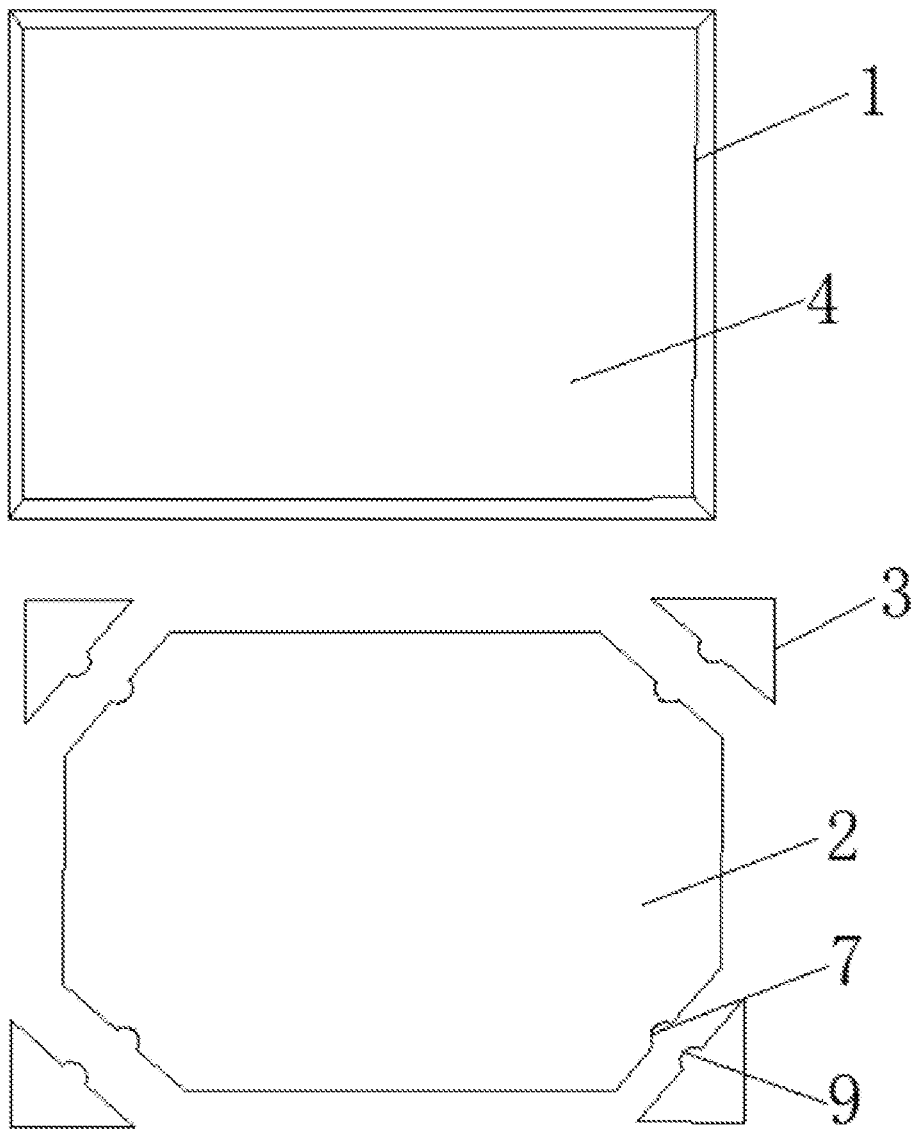
FIG. 1 is an exploded view in accordance with one embodiment of a detachable board.
Figure 3:
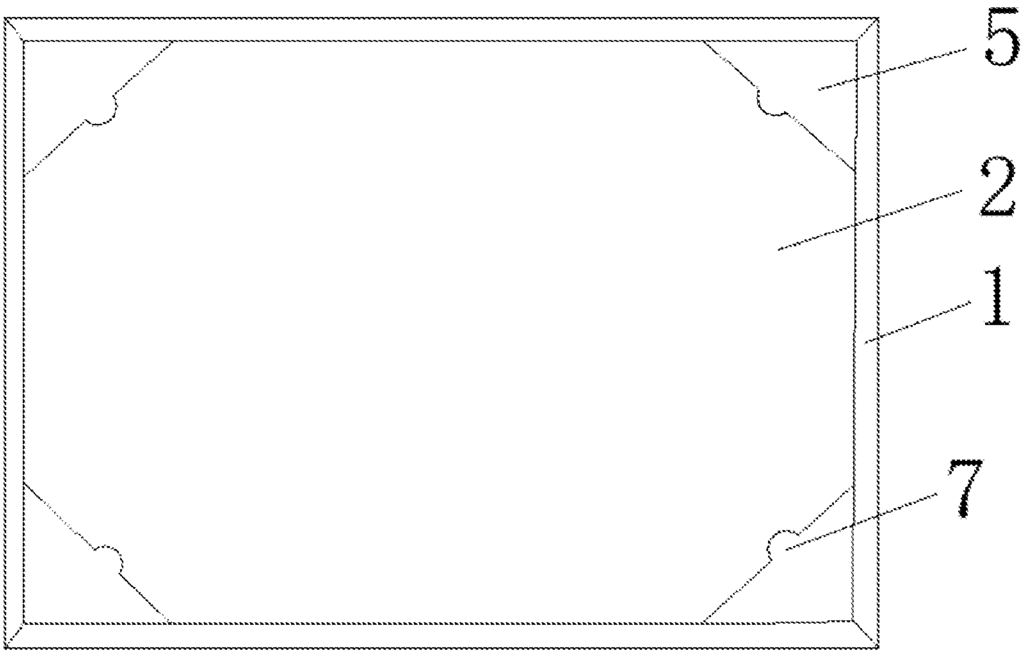
FIG. 3 is an isometric view of the filling foam installed in the recessed area in accordance with another embodiment of the detachable board.

FIG. 1 refer to an embodiment of the present invention. The detachable board comprises a body 1, a filling foam 2, and one or more mounting patches 3. A recessed area 4 is formed on the back of the body by a stamping process with. As illustrated in FIGS. 1 and 3, the filling foam 2 is arranged to be positioned within the recessed area 4, and with the inner walls and/or inner corners of the rim of the recessed area 4, to form one or more mounting slots 5. The shape of each of the mounting slots 5 matches that of each of the mounting patches 3. In one embodiment, the filling foam 2 is further configured to provide one or more notches 7 on its edges that form part of each of the mounting slots 5. The notches 7 allow the insertion of a human finger so to allow easy handling of the filling foam 2 and mounting patches 3 during installation.

Figure 2:
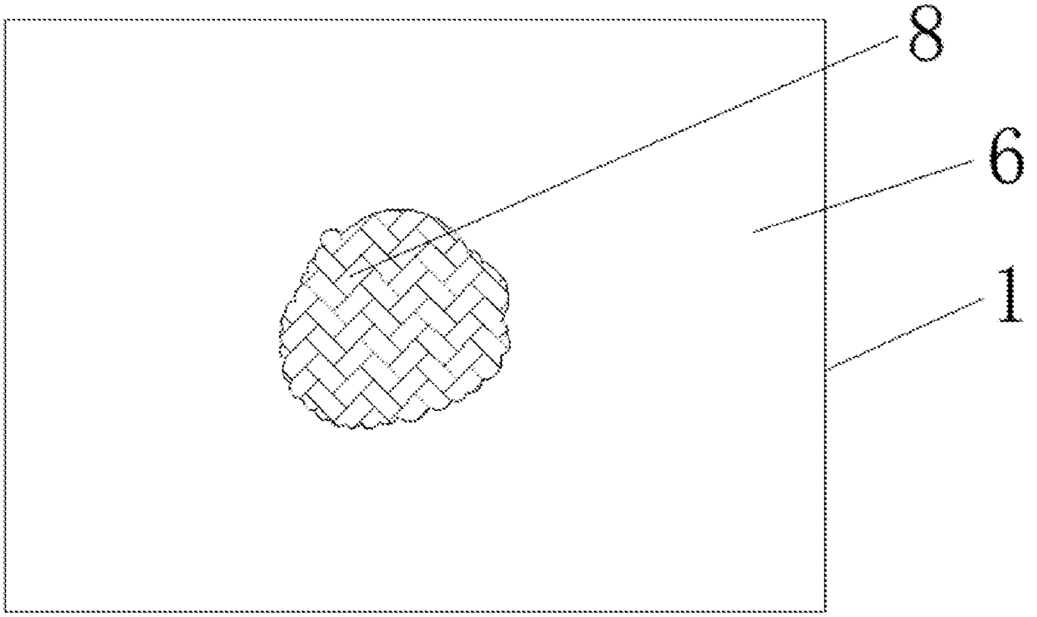
FIG. 2 is an isometric view of the body in accordance with another embodiment of the detachable board.

As illustrated in FIG. 2, it should be noted that in some embodiments the erasable coating 6 is printed with a text pattern 8, and the detachable board may be used for an artwork display.

In one embodiment, the body of the detachable board is coated with a white erasable coating 6 on its front, which is the side opposite to the recessed area 4. A user can erase and write on the erasable coating 6. In another embodiment, the erasable coating 6 is an acrylic resin, the thickness of which is in a range between 0.01 mm-1 mm.

In accordance with one embodiment, the body of the detachable board is made of tinplate material. An ordinarily skilled person in the art will appreciate that other compatible materials, including various metal alloy, polycarbonate, fiber glass, carbon fiber, etc., are readily adoptable in various embodiments of the present invention without undue experimentation or deviation from the spirit of the present invention.

Figure 4:
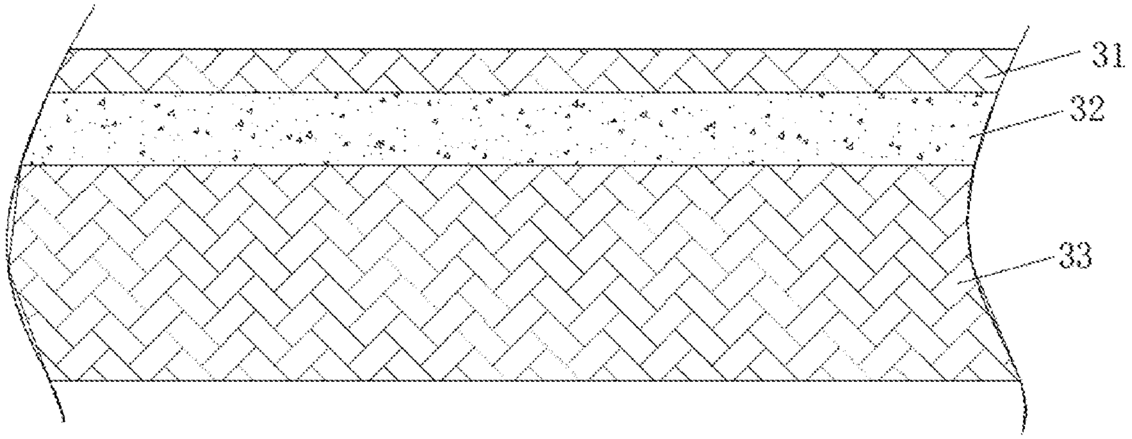
FIG. 4 is a cross-sectional view of the mounting patch in accordance with another embodiment of the detachable board.

As illustrated in FIG. 4, the cross-section of each of the mounting patches 3 from top to bottom is: a release film layer 31; an adhesive layer 32; and a substrate layer 33. The substrate layer 33 is arranged to be in contact with the body 1 of the detachable board when the detachable board when the mounting patches 3 are fitted within the mounting slots 5. The adhesive layer 32 is a removable glue or a silicone with adhesive properties.

In accordance with one embodiment, the thickness of the filling foam 2 is the same as the depth of the recessed area 4. When the filling foam 2 is installed in the recessed area 4, the recessed area 4 is filled with the filling foam 2, and it may prevent the body 1 from deforming after prolonged use.

In accordance with one embodiment, each of the mounting patches 3 has a thickness greater than the depth of the recessed area 4. The mounting patches 3 protrude outward for easy mounting. The horizontal surface area (or volume) of each of the mounting patches 3 is slightly larger than that of each of the mounting slots 5. The mounting patches 3 appear to be extruded in relative to the mounting slots 5 when they are fitted into the mounting slots 5. This way, the mounting patch 3 is in a tight fit in the mounting slot 5, providing strong gripping force such that the mounting patches 3 are not easy to fall off from the body 1. It should be noted that the substrate layer 33 is preferably a sponge, which is conducive to the extrusion of the mounting patches 3, so that they may be fully accommodated within the mounting slots 5. In another embodiment, the substrate layer 33 is a memory foam or an elastic resin.

In one embodiment, the release film layer 31 is provided with a shielding cover 9. The shielding cover 9 and the release film 31 are molded as one piece. The shielding cover 9 may completely cover the notch 7, which may effectively prevent dust from entering. Alternatively, the release film layer 31 may protect the adhesive layer 32.

When in use, only the release film layer 31 is to be peeled off. Subsequently, the adhesive layer 32 is pasted onto a fixed surface, such as glass or a smooth wall, for mounting the detachable board onto the fixed surface.

After use, the detachable board is removed from the glass wall or the wall, while the release film layer 31 is reattached to the adhesive layer 32.

Figure 5:
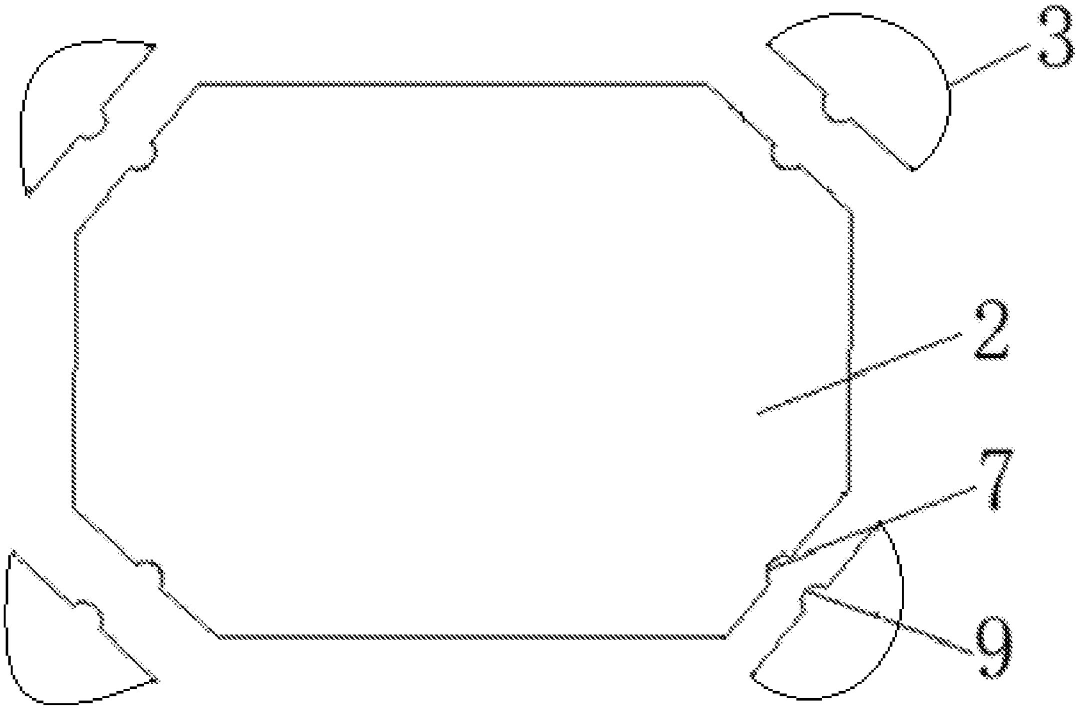
FIG. 5 is an exploded view of the filling foam in accordance with another embodiment of the detachable board.
Figure 6:
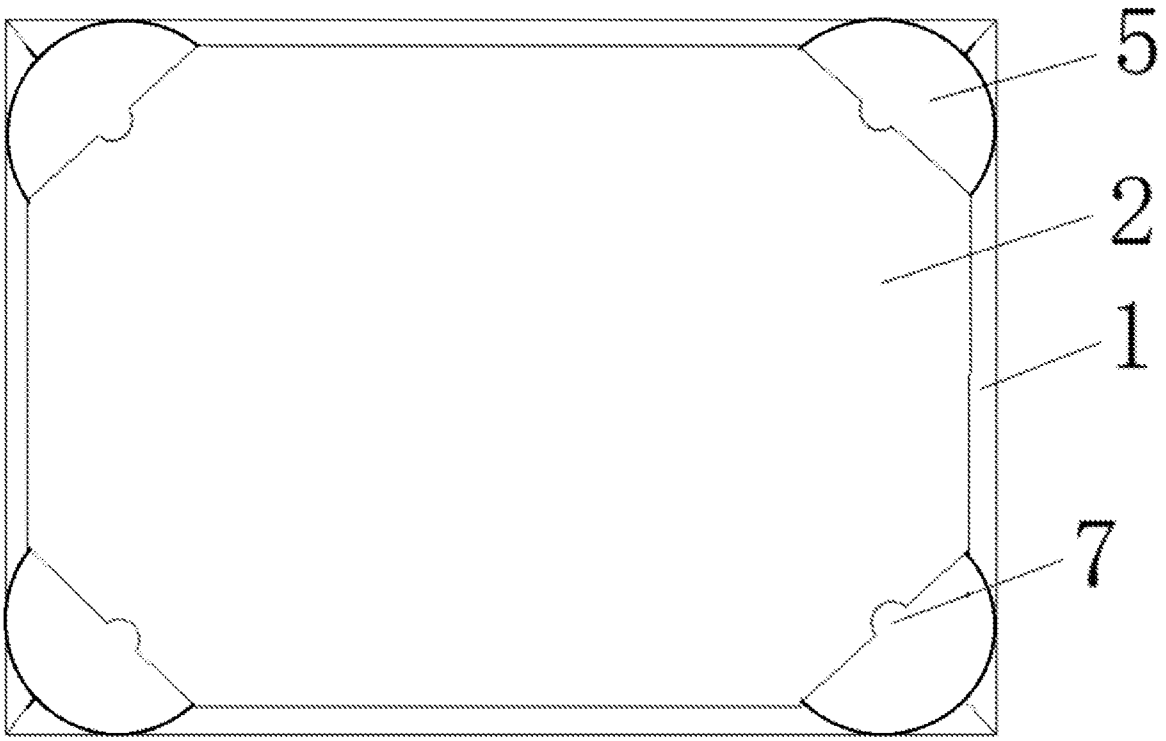
FIG. 6 is an isometric view of the filling foam installed in the recessed area in accordance with another embodiment of the detachable board.

In the various embodiments described herein, the shape of the mounting patches 3 and the mounting slots 5 is triangular; and the number of pairs of mounting patch 3 and mounting slot 5 is four. An ordinarily skilled person in the art will appreciate that other shapes and other number of pairs of mounting patch 3 and mounting slot 5 are readily adoptable without undue experimentation or deviation from the spirit of the present invention. For example, in another embodiment as illustrated in FIGS. 5 and 6, the mounting patches 3 and the mounting slots 5 take the shape of a half circle.

The foregoing description of the present invention has been provided for the purposes of illustration and description. It is not intended to be exhaustive or to limit the invention to the precise forms disclosed. Many modifications and variations would be obvious to the practitioner skilled in the art. From any point of view, embodiments should be regarded as exemplary, and non-restrictive. The embodiments were chosen and described in order to best explain the principles of the invention and its practical application, thereby enabling others skilled in the art to understand the invention for various embodiments and with various modifications that are suited to the particular use contemplated. It is intended to include all changes that fall within the meaning and scope of the equivalent elements of the claims. Any figures or drawings shall not be regarded as limiting the claims to which they relate.

The invention claimed is:

1. A detachable board, comprising:

a body (1);

a filling foam (2); and one or more mounting patches (3);

wherein the body (1) comprises a recessed area (4) on the back of the body (1) made by stamping process;

wherein, during installation, the filling foam (2) is arranged to be positioned within the recessed area (4), and with inner walls and/or inner corners of a rim of the recessed area (4), to form one or more mounting slots (5);

wherein, during installation, each of the mounting patches (3) is snuggly fitted in each of the corresponding mounting slots (5); and wherein the cross-section of the mounting patches (3) from top to bottom, comprising: a release film layer (31), an adhesive layer (32), and a substrate layer (33), the substrate layer (33) is arranged to be in contact with the to the body (1) of the detachable board when installed, the adhesive layer (32) is pasted onto a fixed surface for mounting the detachable board onto the fixed surface.

2. The detachable board of claim 1, wherein the body (1) is made of a tinplate material.

3. The detachable board of claim 1, wherein the filling foam (2) has a first thickness and the recessed area (4) has a depth, wherein the first thickness of the filling foam (2) is same as the depth of the recessed area (4).

4. The detachable board of claim 1, wherein each of the mounting patches (3) has a second thickness greater than the depth of the recessed area (4); and wherein each of the mounting patches (3) has a first volume and each of the mounting slots (5) has a second volume, the first volume is slightly larger than the second volume providing a tight fit for each of the mounting patches (3) in each of the mounting slots (5).

5. The detachable board of claim 1, wherein the filling foam (2) is further configured to provide one or more notches (7) on its edges that form part of each of the mounting slots (5), the notches (7) allow the insertion of a human finger so to allow easy handling of the filling foam (2) and mounting patches (3) during installation.

6. The detachable board of claim 1, wherein the substrate layer (33) is a memory foam or an elastic resin.

7. The detachable board of claim 1, wherein the body (1) is coated with a erasable coating (6) on its front, the front of the body (1) being a side opposite to the recessed area (4).

8. The detachable board of claim 7, wherein the erasable coating (6) has a thickness in a range of 0.01 mm-1 mm, and the erasable coating (6) is made of an acrylic resin.

9. The detachable board of claim 7, wherein the erasable coating (6) is printed with text pattern (8).

* * * * *